US010994854B2

(12) United States Patent
Krier et al.

(10) Patent No.: US 10,994,854 B2
(45) Date of Patent: May 4, 2021

(54) AERODYNAMIC AIRCRAFT WALL COMPRISING AT LEAST ONE VORTEX GENERATOR, AND AIRCRAFT COMPRISING THE SAID AERODYNAMIC WALL

(71) Applicant: Airbus Operations SAS, Toulouse (FR)

(72) Inventors: Erwan Krier, Colomiers (FR); Grégory De Oliveira, Saint Alban (FR); Thomas Bourdieu, Toulouse (FR); Adrien Bas, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 184 days.

(21) Appl. No.: 16/411,958

(22) Filed: May 14, 2019

(65) Prior Publication Data

US 2019/0367175 A1 Dec. 5, 2019

(30) Foreign Application Priority Data

May 30, 2018 (FR) ...................................... 1854656

(51) Int. Cl.
*B64C 23/06* (2006.01)
*B64D 29/06* (2006.01)

(52) U.S. Cl.
CPC .............. *B64D 29/06* (2013.01); *B64C 23/06* (2013.01); *B64C 2230/06* (2013.01); *Y10T 428/24182* (2015.01)

(58) Field of Classification Search
CPC ............ Y10T 428/24182; B64C 23/06; B64C 2230/06; F05B 2240/122; F15D 1/003; F15D 1/004; F42B 10/06
USPC ........................................ 244/200.1; 415/914
See application file for complete search history.

(56) References Cited

U.S. PATENT DOCUMENTS

| | | | |
|---|---|---|---|
| 2,764,373 | A | 5/1953 | Anderson et al. |
| 2,851,950 | A | 9/1958 | Van Aken et al. |
| 9,937,998 | B2 | 4/2018 | Frost |
| 2008/0067292 | A1 | 3/2008 | Bonnaud et al. |
| 2012/0100005 | A1 | 4/2012 | Ostergaard Kristensen et al. |
| 2018/0155007 | A1 | 6/2018 | Hayashi et al. |

FOREIGN PATENT DOCUMENTS

| | | | |
|---|---|---|---|
| EP | 2444658 | A1 | 4/2012 |
| EP | 3305654 | A1 | 4/2018 |
| FR | 2905930 | A1 | 3/2008 |

OTHER PUBLICATIONS

French Search Report; priority document.

*Primary Examiner* — Alexander S Thomas
(74) *Attorney, Agent, or Firm* — Greer, Burns & Crain, Ltd.

(57) ABSTRACT

An aerodynamic aircraft wall has external and internal surfaces and is equipped with at least one vortex generator. The vortex generator has at least one active wall projecting with respect to the external surface of the aerodynamic wall. A connecting system connects the vortex generator to the aerodynamic wall. The connecting system includes at least one support having a base pressed firmly against the internal surface of the aerodynamic wall and a head which passes through the aerodynamic wall and collaborates with the active wall, at least one first fastener connecting the base of the support and the aerodynamic wall, at least one second fastener connecting the head of the support and the active wall.

9 Claims, 2 Drawing Sheets

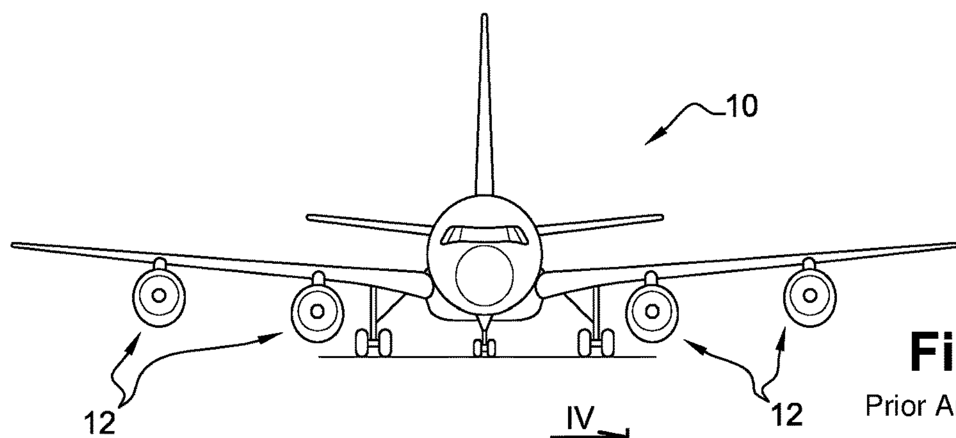
Fig. 1
Prior Art
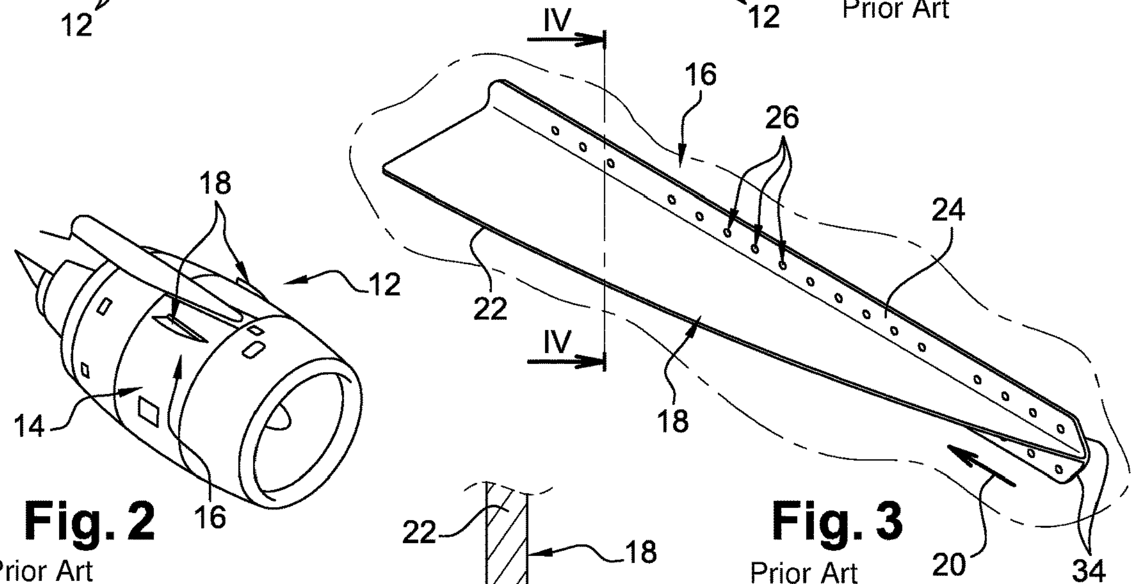
Fig. 2
Prior Art
Fig. 3
Prior Art
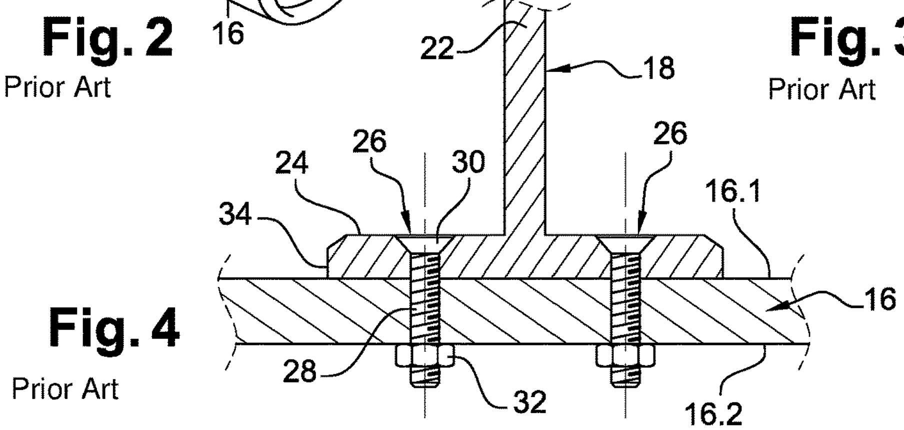
Fig. 4
Prior Art
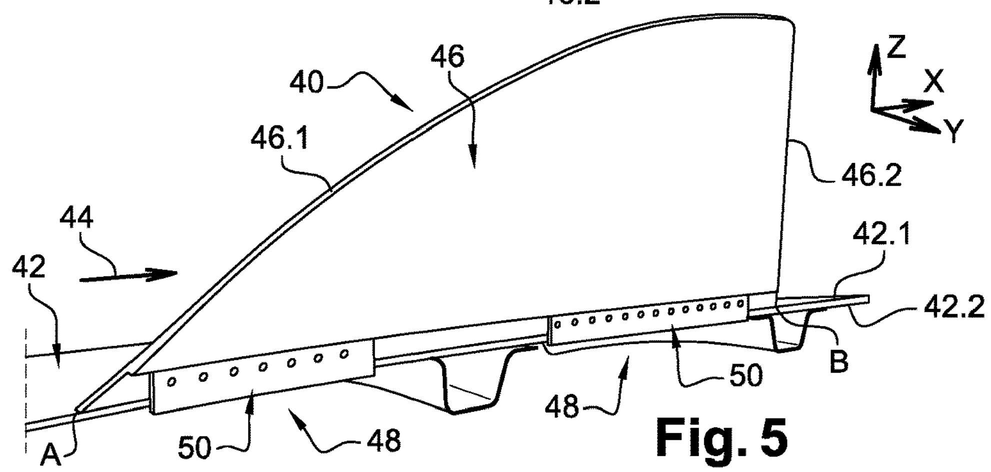
Fig. 5

46
76
84.2
84.1
78
78'
84.3
88
88
58
74
86
82
82'
72
42.1
60
80
72
42
50
54
40
46

54
58
42
42.1
52.2
52.1
42.2
56'
50
52
48
56

40
46
58
74
42
42.1
54
42.1
68
62
90
50
42.2
56
42
66
56'
48

42.2
64
52
56,56'
70

AERODYNAMIC AIRCRAFT WALL COMPRISING AT LEAST ONE VORTEX GENERATOR, AND AIRCRAFT COMPRISING THE SAID AERODYNAMIC WALL

CROSS-REFERENCES TO RELATED APPLICATIONS

This application claims the benefit of the French patent application No. 1854656 filed on May 30, 2018, the entire disclosures of which are incorporated herein by way of reference.

FIELD OF THE INVENTION

The present application relates to an aerodynamic aircraft wall comprising at least one vortex generator and to an aircraft comprising the aerodynamic wall.

BACKGROUND OF THE INVENTION

As illustrated in the figures, an aircraft 10 comprises several propulsion assemblies 12 each of which has a nacelle 14 surrounding a propulsion unit. The nacelle 14 comprises at least one aerodynamic wall 16, such as a cowl for example, comprising at least one vortex generator 18, also referred to as a chine or strake.

According to one embodiment visible in FIGS. 3 and 4, the aerodynamic wall 16 has an external surface 16.1 facing towards the outside of the nacelle 14, against which a flow of air 20 flows, and an internal surface 16.2 facing towards the inside of the nacelle 14. The vortex generator 18 comprises a T-shaped cross section and has an active wall 22 and a mount 24 projecting with respect to the external surface 16.1 of the aerodynamic wall 16 and connected thereto by fasteners 26.

The mount 24 extends on each side of the active wall 22 and the fasteners 26 are arranged in two rows positioned on each side of the active wall 22. For each fastener 26, the mount 24 and the aerodynamic wall 16 each comprise a through-hole, the through-hole in the mount 24 being countersunk. To complement that, each fastener 26 comprises a shank 28 housed in the through-holes in the mount 24 and in the aerodynamic wall 16, a countersunk head 30 housed in the countersunk part of the through-hole in the mount 24, and an immobilizing system 32, such as a nut for example, connected to the shank 28 and pressed firmly against the aerodynamic wall 16.

The vortex generators 18, positioned on each side of the pylon on the nacelle cowl, make it possible to obtain aerodynamic improvement, notably by delaying the separation of the air flow over the extrados of the wing and by increasing lift during landing phases.

However, the mount 24 of the vortex generator has a forward edge 34 that projects with respect to the external surface 16.1 of the aerodynamic wall 16, and this disrupts the air flow and generates unwanted drag.

The present invention seeks to remedy some or all of the drawbacks of the prior art.

SUMMARY OF THE INVENTION

To this end, one subject of the invention is an aerodynamic aircraft wall comprising a vortex generator, the aerodynamic wall having an external surface over which a flow of air flows during flight, and an internal surface opposite to the external surface, the vortex generator comprising at least one active wall projecting with respect to the external surface of the aerodynamic wall and a connecting system connecting the vortex generator and the aerodynamic wall.

According to the invention, the connecting system comprises:

- at least one support having a base pressed firmly against the internal surface of the aerodynamic wall and a head which passes through the aerodynamic wall, the head of the support and the active wall having shapes which collaborate in such a way as to fit one into the other,
- at least one first fastener connecting the base of the support and the aerodynamic wall,
- at least one second fastener connecting the head of the support and the active wall, keeping the active wall and the head of the support in a position in which the one is fitted into the other.

The invention makes it possible to avoid the appearance of unwanted drag, with a negligible impact on the on-board mass and assembly time.

According to another feature, the aerodynamic wall comprises, for each support, a cutout configured to house the head of the support, the cutout and the head of the support having contours that are identical to within an assembly clearance, the assembly clearance containing a seal or mastic lying flush with the external surface of the aerodynamic wall.

According to another feature, each support has a T-shaped cross section, the base comprising first and second parts positioned on each side of the head, the connecting system comprising a first series of first fasteners positioned on the first part of the base, and a second series of first fasteners positioned on the second part of the base.

According to another feature, the first fasteners are of the type that lie flush on the external surface of the aerodynamic wall.

According to a first embodiment, the active wall comprises an edge, facing towards the aerodynamic wall, which has at least one rebate, and the head of each support comprises at least one tongue configured to fit into the rebate, the tongue and the rebate having identical thicknesses.

According to one configuration, the active wall comprises, on each side of each rebate, first and second branches and the head of the support comprises, on each side of each tongue, first and second end-stops, the tongue and the rebate being dimensioned in such a way that the ends of the first and second branches are in contact with the first and second end-stops when the tongue is inserted into the rebate.

According to a second embodiment, the head of each support has a rebate configured to house an edge of the active wall, facing towards the aerodynamic wall, the active wall and the rebate having identical thicknesses.

According to another feature, the connecting system comprises several second fasteners of the flush-fitting type.

Another subject of the invention is an aircraft comprising an aerodynamic wall according to one of the aforementioned features.

BRIEF DESCRIPTION OF THE DRAWINGS

Other features and advantages will emerge from the following description of the invention, which description is given solely by way of example, with reference to the appended drawings in which:

FIG. 1 is a front view of an aircraft,

FIG. 2 is a perspective view of a propulsion assembly of the aircraft visible in FIG. 1, FIG. 3 is a perspective view of part of a nacelle equipped with a vortex generator, illustrating one embodiment of the prior art, FIG. 4 is a section on IV-IV of FIG. 3, FIG. 5 is a schematic depiction of a vortex generator, illustrating one embodiment of the invention.

DETAILED DESCRIPTION OF THE PREFERRED EMBODIMENTS

Figure 6:
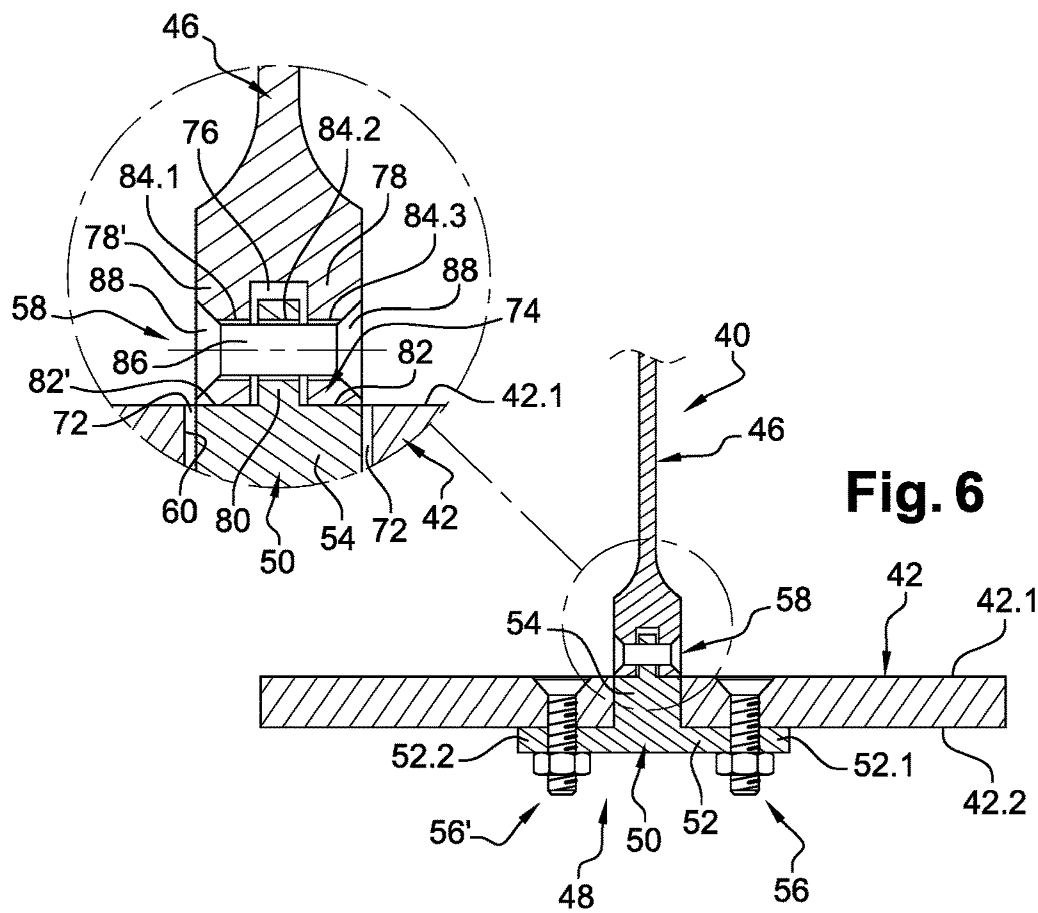
FIG. 6 is a cross section through part of an aircraft nacelle wall equipped with a vortex generator, illustrating a first embodiment of the invention.
Figure 7:
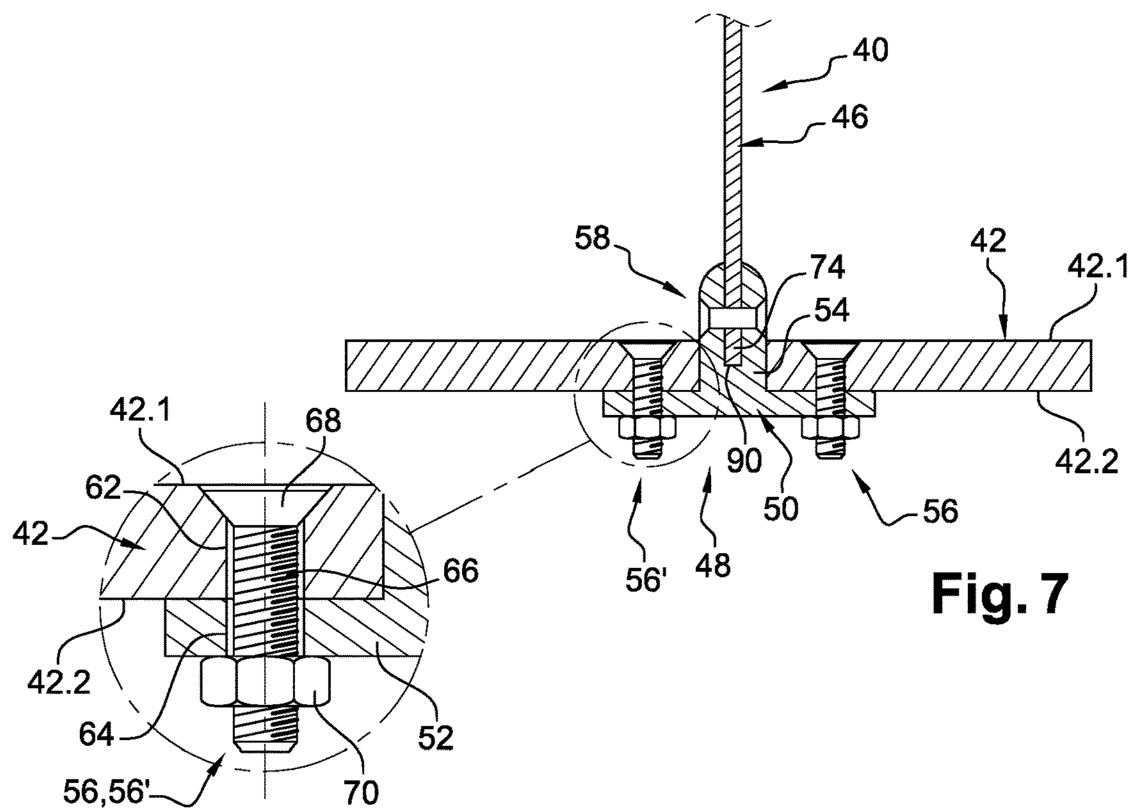
FIG. 7 is a cross section through part of an aircraft nacelle wall equipped with a vortex generator, illustrating a second embodiment of the invention.

FIGS. 5 to 7 depict at 40 a vortex generator positioned on an aerodynamic wall 42 of an aircraft nacelle.

Although described in an application to an aircraft nacelle, the invention is not in any way limited to this application and may be applied to any aerodynamic wall of an aircraft, such as, for example, a fuselage, and empennage, a wing, a pylon, a nacelle.

An aerodynamic wall 42 may comprise a single panel or a number of juxtaposed panels.

The aerodynamic wall 42 has an external surface 42.1 against which a flow of air 44 flows in flight, and an internal surface 42.2 opposite to the external surface 42.1.

For the remainder of the present application, the terms front and rear refer to the direction in which the flow of air 44 flows, this air during flight flowing from the front towards the rear.

What is meant by a vortex generator is any wall projecting with respect to an aerodynamic wall of an aircraft and which is configured to modify a flow of air flowing over the surface of this aerodynamic wall. A vortex generator is also referred to as a chine or strake.

According to the various embodiments visible in FIGS. 5 to 7, the vortex generator 40 comprises at least one substantially planar active wall 46 projecting with respect to the external surface 42.1 of the aerodynamic wall 42. This active wall 46 comprises a leading edge 46.1 and a trailing edge 46.2. The vortex generator 40 comprises a front end A and a rear end B, which are positioned at the external surface 42.1 of the aerodynamic wall 42 when the vortex generator 40 is fitted.

According to one configuration, the active wall 46 is approximately in the shape of a triangle. Thus, the leading edge 46.1 comprises a first, front, end, positioned at the external surface 42.1 of the aerodynamic wall 42, and a second, rear, end connected to the trailing edge 46.2 and separated from the external surface 42.1 of the aerodynamic wall 42.

Of course, the invention is not limited to this configuration.

According to a first embodiment visible in FIG. 6, the vortex generator 40 comprises a connecting system 48 designed to connect the active wall 46 and the internal surface 42.2 of the aerodynamic wall 42.

This connecting system 48 comprises:

- at least one support 50 having a base 52 pressed firmly against the internal surface 42.2 of the aerodynamic wall 42 and a head 54 which passes through the aerodynamic wall 42,
- at least one first fastener 56 connecting the base 52 of the support 50 and the aerodynamic wall 42,
- at least one second fastener 58 connecting the head 54 of the support 50 and the active wall 46.

The connecting system 48 comprises a single support 50 or, as illustrated in FIG. 5, several supports 50 distributed along the length of the vortex generator 40 (the length corresponding to the dimension of the vortex generator between the first and second ends A and B).

To complement this, the aerodynamic wall 42 comprises, for each support 50, a cutout 60 configured to house the head 54 of the support 50, the cutout 60 and the head 54 of the support 50 having contours that are identical to within an assembly clearance.

According to one configuration, each support 50 has a T-shaped cross section, the base 52 comprising first and second parts 52.1, 52.2 positioned on each side of the head 54.

The connecting system 48 comprises a first series of first fasteners 56, positioned in at the first part 52.1 of the base 52, and a second series of first fasteners 56' positioned at the second part 52.2 of the base 52.

As illustrated in FIG. 7, for each first fastener 56, 56', the aerodynamic wall 42 comprises a through-hole 62 which has a countersink at the external surface 42.1 of the aerodynamic wall 42 and the base 52 comprises a through-hole 64. To complement that, each first fastener 56, 56' comprises a shank 66 housed in the through-holes 62, 64 in the aerodynamic wall 42 and in the base 52, a countersunk head 68 housed in the countersunk part of the through-hole 62 in the aerodynamic wall 42, and an immobilizing system 70, such as a nut for example, connected to the shank 66 and pressed firmly against the base 52.

The first fasteners 56, 56' are of the type that lie flush on the external surface 42.1 of the aerodynamic wall 42 and disrupt the air flow 44 virtually not at all.

In order to improve the aerodynamic characteristics, the assembly clearance between the cutout 60 and the head 54 of the support 50 and/or the active wall 46 contains a seal or mastic 72 lying flush with the external surface 42.1 of the aerodynamic wall 42.

According to the first embodiment, the active wall 46 comprises an edge 74 oriented towards the aerodynamic wall 42 and which has at least one rebate 76.

According to circumstances, the edge 74 exhibits a single rebate 76 which extends over the entire length, or a plurality of disjointed rebates 76 configured to at least partially accommodate the head 54 of each support 50.

The active wall 46 comprises, on each side of each rebate 76, first and second branches 78, 78'. To complement that, the head 54 of each support 50 has at least one tongue 80 configured to fit into the rebate 76, and first and second end-stops 82, 82' on each side of each tongue 80.

The tongue 80 and the rebate 76 have identical thicknesses. In addition, the tongue 80 and the rebate 76 are dimensioned in such a way that the ends of the first and second branches 78, 78' are in contact with the first and second end-stops 82, 82' when the tongue 80 is inserted into the rebate 76.

The connecting system 48 comprises several second fasteners 58 to hold the tongue 80 in the rebate 76 and immobilize the active part 46 with respect to the aerodynamic wall 42. These second fasteners 58 are aligned parallel to the aerodynamic wall 42.

For each second fastener 58, the first branch 78, the tongue 80 and the second branch 78' have through-holes 84.1, 84.2, 84.3, the through-holes 84.1, 84.3, of the first and second branches 78, 78' being countersunk. To complement that, each second fastener 58 comprises a shank 86 which is housed in the through-holes 84.1, 84.2, 84.3, and, at each end of the shank 86, countersunk heads 88 housed in the countersunk parts of the through-holes 84.1, 84.3, of the first and second branches 78, 78'.

The second fasteners 58 are of the type that lie flush and disrupt the air flow 44 virtually not at all.

According to a second embodiment visible in FIGS. 5 and 7, the head 54 of each support 50 has a rebate 90 configured to house the edge 74 of the active wall 46.

The active wall 46 and the rebate 90 have identical thicknesses.

The connecting system 48 comprises several second fasteners 58 to hold the active wall 46 in the rebate 90 of the head 54 of the support 50 and immobilize the active part 46 with respect to the aerodynamic wall 42. These second fasteners 58 are aligned parallel to the aerodynamic wall 42.

Like with the first embodiment, the second fasteners 58 are of the type that lie flush and disrupt the air flow 44 virtually not at all.

Whatever the embodiment, the head 54 of the support 50 and the active wall 46 have shapes which collaborate with one another so as to fit one into the other, the second fasteners 58 allowing the active wall 46 to be immobilized with respect to the support 50 in a position in which the one is fitted into the other. Because the support 50 is positioned on the inside of the aerodynamic wall, it does not generate any unwanted drag.

The invention makes it possible to avoid the appearance of unwanted drag which is present in the case of the vortex generators of the prior art, while having a negligible impact on the on-board mass and assembly time.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aerodynamic aircraft wall comprising:
- a vortex generator,
- an external surface over which a flow of air flows during flight, and
- an internal surface opposite to the external surface,
  - the vortex generator comprising at least one active wall projecting with respect to the external surface of the aerodynamic wall and a connecting system connecting the vortex generator and the aerodynamic wall,
- the connecting system comprising:
  - at least one support having a base pressed firmly against the internal surface of the aerodynamic wall and a head which passes through the aerodynamic wall, the head of the support and the active wall having shapes which collaborate in such a way as to fit one into the other,
  - at least one first fastener connecting the base of the support and the aerodynamic wall,
  - at least one second fastener connecting the head of the support and the active wall, keeping the active wall and the head of the support in a position in which the one is fitted into the other.

2. The aircraft aerodynamic wall according to claim 1, wherein the aerodynamic wall comprises, for the support, a cutout configured to house the head of the support, the cutout and the head of the support having contours that are identical to within an assembly clearance, the assembly clearance containing a seal or mastic lying flush with the external surface of the aerodynamic wall.

3. The aircraft aerodynamic wall according to claim 1, wherein the support has a T-shaped cross section with a base and a head, the base comprising first and second parts positioned at each side of the head, and wherein the connecting system comprises a first series of first fasteners positioned at the first part of the base, and a second series of first fasteners positioned at the second part of the base.

4. The aircraft aerodynamic wall according to claim 1, wherein the at least one first fastener is of a type that lies flush on the external surface of the aerodynamic wall.

5. The aircraft aerodynamic wall according to claim 1, wherein the active wall comprises an edge, facing towards the aerodynamic wall, which has at least one rebate, and wherein the head of the support comprises at least one tongue configured to fit into the rebate, the tongue and the rebate having identical thicknesses.

6. The aircraft aerodynamic wall according to claim 5, wherein the active wall comprises, on each side of each rebate, first and second branches and wherein the head of the support comprises, on each side of each tongue, first and second end-stops, the tongue and the rebate being dimensioned such that ends of the first and second branches are in contact with the first and second end-stops when the tongue is inserted into the rebate.

7. The aircraft aerodynamic wall according to claim 1, wherein the head of the support has a rebate configured to house an edge of the active wall, facing towards the aerodynamic wall, the active wall and the rebate having identical thicknesses.

8. The aircraft aerodynamic wall according to claim 1, wherein the connecting system comprises several second fasteners of flush-fit type.

9. An aircraft comprising an aerodynamic wall according to claim 1.

* * * * *